(12) United States Patent
Webb

(10) Patent No.: US 12,355,179 B2
(45) Date of Patent: Jul. 8, 2025

(54) COVER PLATE WITH CONCEALABLE PANEL

(71) Applicant: Jeff H. Webb, Chillicothe, OH (US)

(72) Inventor: Jeff H. Webb, Chillicothe, OH (US)

( * ) Notice: Subject to any disclaimer, the term of this patent is extended or adjusted under 35 U.S.C. 154(b) by 345 days.

(21) Appl. No.: 17/979,319

(22) Filed: Nov. 2, 2022

(65) Prior Publication Data

US 2023/0140416 A1   May 4, 2023

Related U.S. Application Data

(60) Provisional application No. 63/274,974, filed on Nov. 3, 2021.

(51) Int. Cl.
*H01R 13/447* (2006.01)
*G09F 3/18* (2006.01)
*H02G 3/14* (2006.01)

(52) U.S. Cl.
CPC .............. *H01R 13/447* (2013.01); *G09F 3/18* (2013.01); *H02G 3/14* (2013.01)

(58) Field of Classification Search
CPC .... H01R 13/447; H01R 13/465; H01R 24/78; H01R 25/006; G09F 3/18; G09F 3/201; H02J 7/0044; H02G 3/14
See application file for complete search history.

(56) References Cited

U.S. PATENT DOCUMENTS 5,212,347 A * 5/1993 Powers ..................... H02G 3/14
174/67

FOREIGN PATENT DOCUMENTS

EP        1995838 A2 * 11/2008 ............. H02G 3/081

\* cited by examiner

*Primary Examiner* — Michael C Zarroli
(74) *Attorney, Agent, or Firm* — Thomas E. Lees, LLC

(57) ABSTRACT

An outlet cover plate comprises a fastener aperture for a fastener to mount the outlet cover to a receptacle that includes associated hardware. Further, the outlet cover plate includes a face with a pocket that includes a catch along with an aperture for access to the associated hardware. A concealable panel has a writing surface and a projection that corresponds to the catch. The concealable panel fits in the pocket where it can be positioned in a first position where the concealable panel is stowed within the pocket and a second position where the writing surface is viewable outside the pocket. The pocket is located below the aperture such that a user can pull down on the concealable panel to put the concealable panel from the first position to the second position. The protrusion and catch keep the concealable panel in the first position until the concealable panel is pulled.

9 Claims, 9 Drawing Sheets

COVER PLATE WITH CONCEALABLE PANEL

CROSS REFERENCE TO RELATED APPLICATIONS

This application claims the benefit of U.S. Provisional Patent Application Ser. No. 63/274,974, filed Nov. 3, 2021, entitled "COVER PLATE WITH CONCEALABLE PANEL", the disclosure of which is hereby incorporated by reference.

BACKGROUND

Various aspects of the present invention relate generally to cover plates for electrical receptacles or switches, and more specifically to being able to store information on cover plates for electrical receptacles or switches.

Electrical power receptacles are placed throughout buildings to distribute power to devices requiring electrical power. These devices include a plug that corresponds to hardware on the receptacle. For example, some devices require a positive terminal and a negative terminal for power and are not concerned with ground. Such devices will have plugs that only include positive and negative terminals and can be plugged into a receptacle that includes only positive and negative slots or a receptacle that includes a positive slot, a negative slot, slot and an aperture for ground. Other devices require all three: positive, negative, and ground.

To help prevent a power surge from destroying electrical devices plugged into receptacles or to remove power from a group of receptacles, circuit breakers or fuses are placed in series with the group of receptacles. Thus, if someone needs to work on a receptacle, the person can remove the fuse or turn off the circuit breaker associated with that receptacle.

BRIEF SUMMARY

According to various aspects of the present disclosure, an outlet cover plate comprises a fastener aperture for a fastener to mount the outlet cover to a receptacle that includes associated hardware. Further, the outlet cover plate includes a face with a pocket that includes a catch along with an aperture for access to the associated hardware. A concealable panel has a writing surface and a projection that corresponds to the catch. The concealable panel fits in the pocket where it can be positioned in a first position where the concealable panel is stowed within the pocket and a second position where the writing surface is viewable outside the pocket. The pocket is located below the aperture such that a user can pull down on the concealable panel to put the concealable panel from the first position to the second position. The protrusion and catch keep the concealable panel in the first position until the concealable panel is pulled.

According to further aspects of the present disclosure, outlet cover plate comprises a fastener aperture for an associated fastener to mount the outlet cover a receptacle that includes associated hardware. The outlet cover plate further includes a face including a pocket and an aperture for access to the associated hardware. A concealable panel fits in the pocket and is selectably positionable between a first position where the concealable panel is stowed within the pocket and a second position where the writing surface is viewable outside the pocket.

DETAILED DESCRIPTION

A cover plate with a concealable panel allows users to place information on the cover plate about electrical wiring/systems associated with an electrical receptacle, switch, or other device that the cover plate covers or other information as may be desired. The user may then stow the concealable panel, so the writing on the concealable panel is not seen. When a person desires to read the information on the stowed concealable panel, the person just needs to slide the panel out from the stowed position, read the information, and re-stow the concealable panel.

Existing solutions include writing information on a front of a cover, but this solution can be unsightly and not aesthetically pleasing. Other solutions include writing the information on a back of the cover, but this solution requires a user to remove the cover to gain access to that information.

Figure 1:
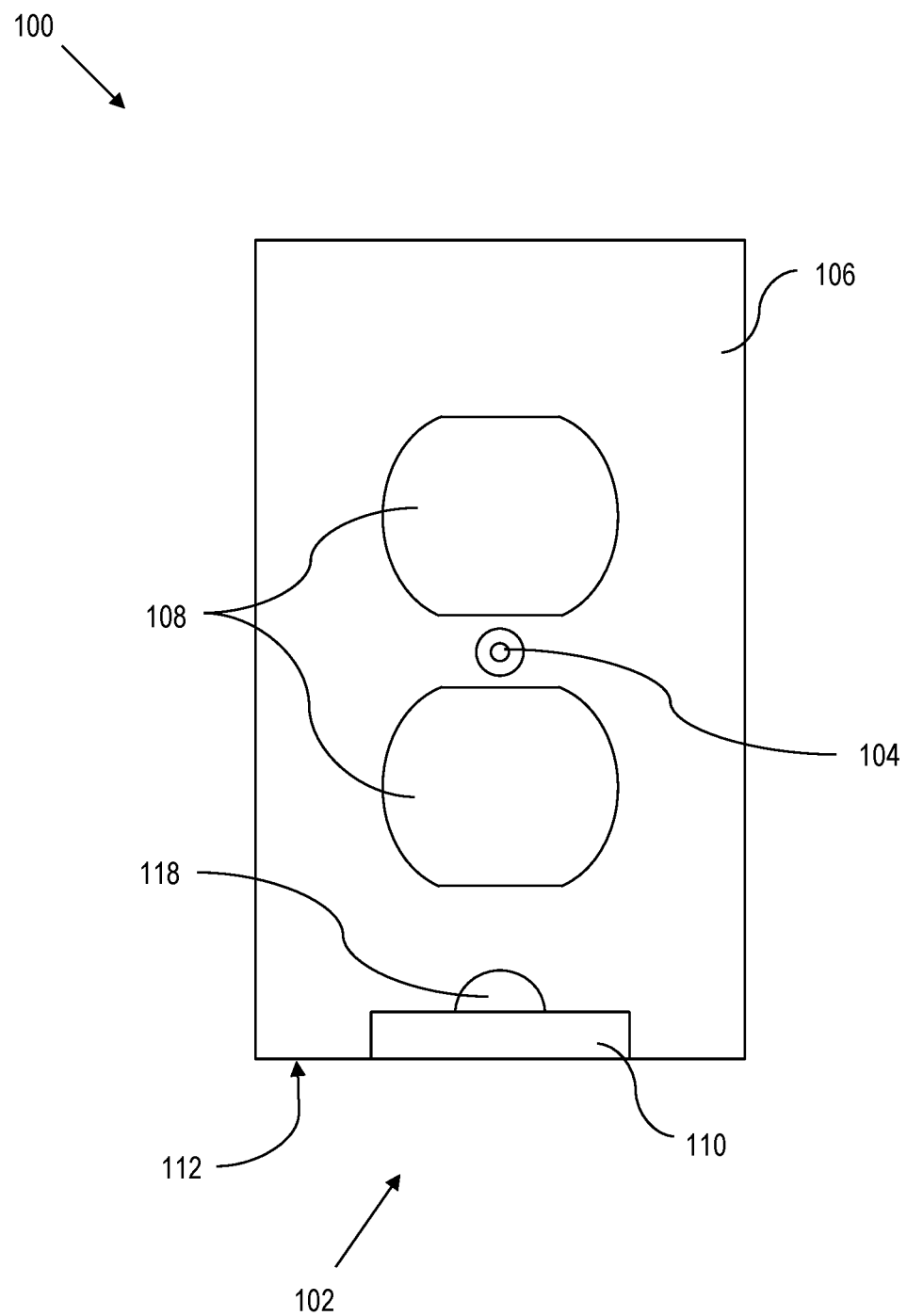
FIG. 1 is a front view of a cover plate with a concealable panel in a first position, according to aspects of the present disclosure.

Turning now to the figures, and in particular to FIG. 1, an embodiment of a cover plate 100 with a concealable panel 102 in a first position (e.g., a stowed position) is shown. The cover plate 100 includes a fastener aperture 104 on a face 106 so an associated fastener can be used to mount the cover plate 100 to a wall with associated hardware. For example, in a typical 120-volt electrical receptacle (e.g., a duplex receptacle), there are two electrical outlets that each have a positive receptacle and a negative receptacle (and an optional ground receptacle) that are contained in an outlet box, which includes a threaded aperture to couple to a cover plate (e.g., embodiments of the cover plate 100 described herein).

Moreover, the cover plate 100 includes at least one aperture 108 that corresponds to the associated hardware of the associated receptacle. As shown in the embodiment of FIG. 1, the cover plate 100 includes two apertures 108 for the associated hardware. However, any number of apertures may be included based on a configuration of the hardware associated with the receptacle. In some embodiments, the cover plate 100 includes different sized apertures 108 (e.g., for a switch). In numerous embodiments, the cover plate 100 includes different shaped apertures 108 (e.g., for a higher voltage).

Figure 2:
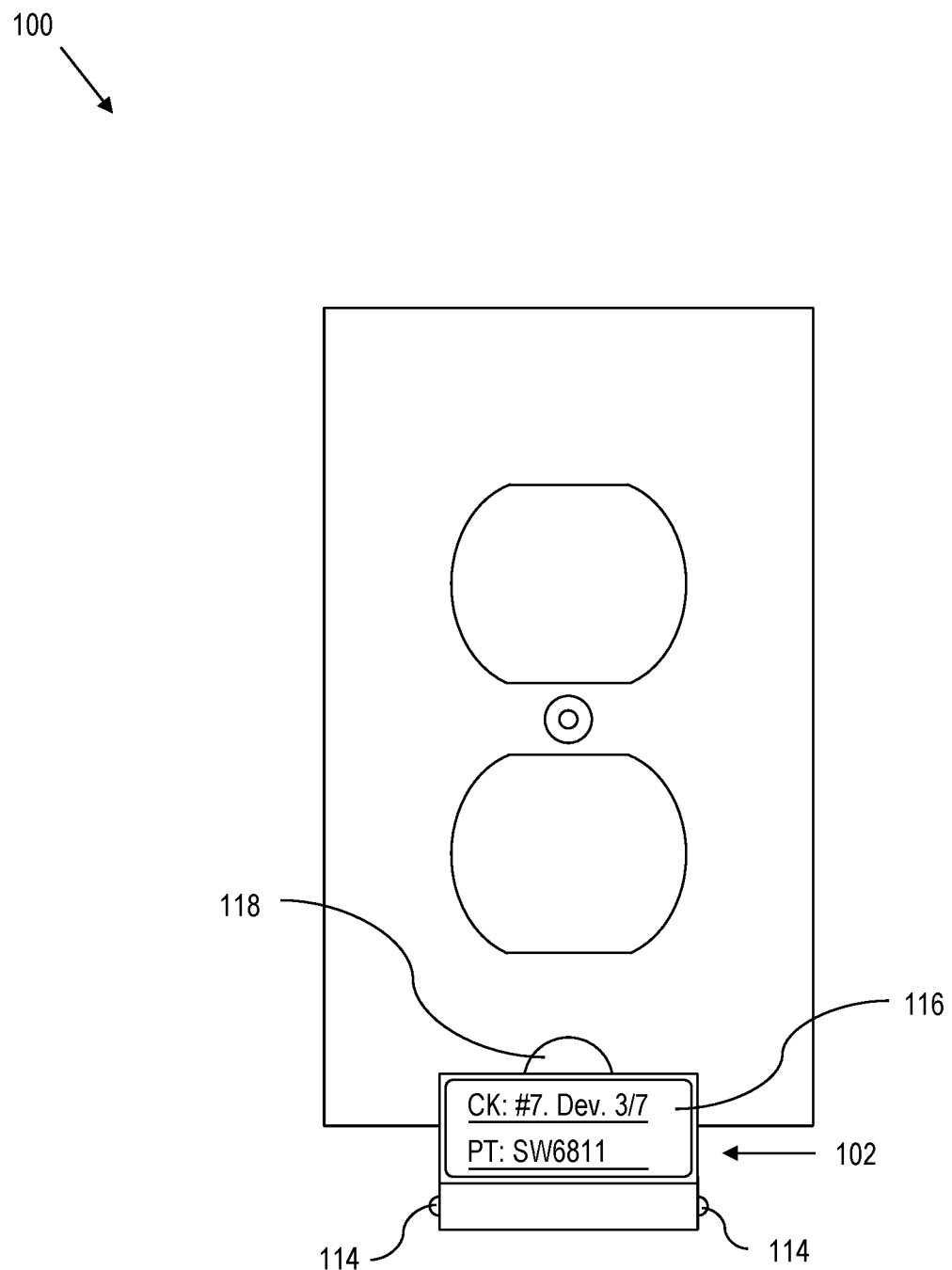
FIG. 2 is a front view of the cover plate with the concealable panel in a second position, according to aspects of the present disclosure.

As mentioned above, the cover plate 100 includes the concealable panel 102 that may be placed in a first position and a second position. As shown in FIG. 1, the concealable panel 102 is in the first position, which (in the embodiment of FIGS. 1-2) is a stowed position. In FIG. 2, the concealed panel 102 of the cover plate 100 is in the second position, which (in the embodiment of FIGS. 1-2) is an open position. While the embodiment of FIGS. 1-2 illustrates the concealable panel 102 at a bottom of the cover plate 100, the concealable panel 102 may be at a top of the cover plate 100, on either side of the cover plate 100, or combinations thereof. Further, more than one concealable panel 102 may be present on embodiments of the cover plate 100.

Referring to both FIGS. 1-2, the concealable panel 102 includes a lip 110 that conforms to a shape of the cover plate 100 such that when the concealable panel 102 is in the stowed position, the lip 110 aligns with an edge 112 of the cover plate 100. For example, if the cover plate 100 includes a beveled edge 112, then the lip 110 will include a beveled edge. Further, in many embodiments, the concealable plate 102 includes two projections 114 that interact with corresponding catches on the cover plate 100 to counteract gravity when the concealable panel 102 is in the stowed position (as shown in FIG. 1), preventing the concealable panel 102 from transitioning to the open position. In some embodiments, the cover plate 100 includes the projections and the concealable panel includes the catches. In numerous embodiments (e.g., where the concealable panel 102 is somewhere other than the bottom of the cover plate 100), there are no projections and corresponding catches. Further, the projections 114 may be located anywhere along the concealable panel 102.

Moreover, the concealable panel 102 includes a writing surface 116. The writing surface 116 may be of any suitable material (e.g., paper (e.g., a sticker), plastic, a matte coating, etc.) to receive written and/or printed information. Thus, the person may place useful information on the writing surface such as a breaker associated with the electrical receptacle, a fuse associated with the electrical receptacle, a pattern for operation of a two-way switch, a color identity of a paint used on walls around the electrical receptacle, etc.

In various embodiments, the cover plate 100 includes a recess 118 to allow a person to place a finger on the lip 110 of the panel 102 to transition the panel 102 from the stowed position to the open position.

Figure 3:
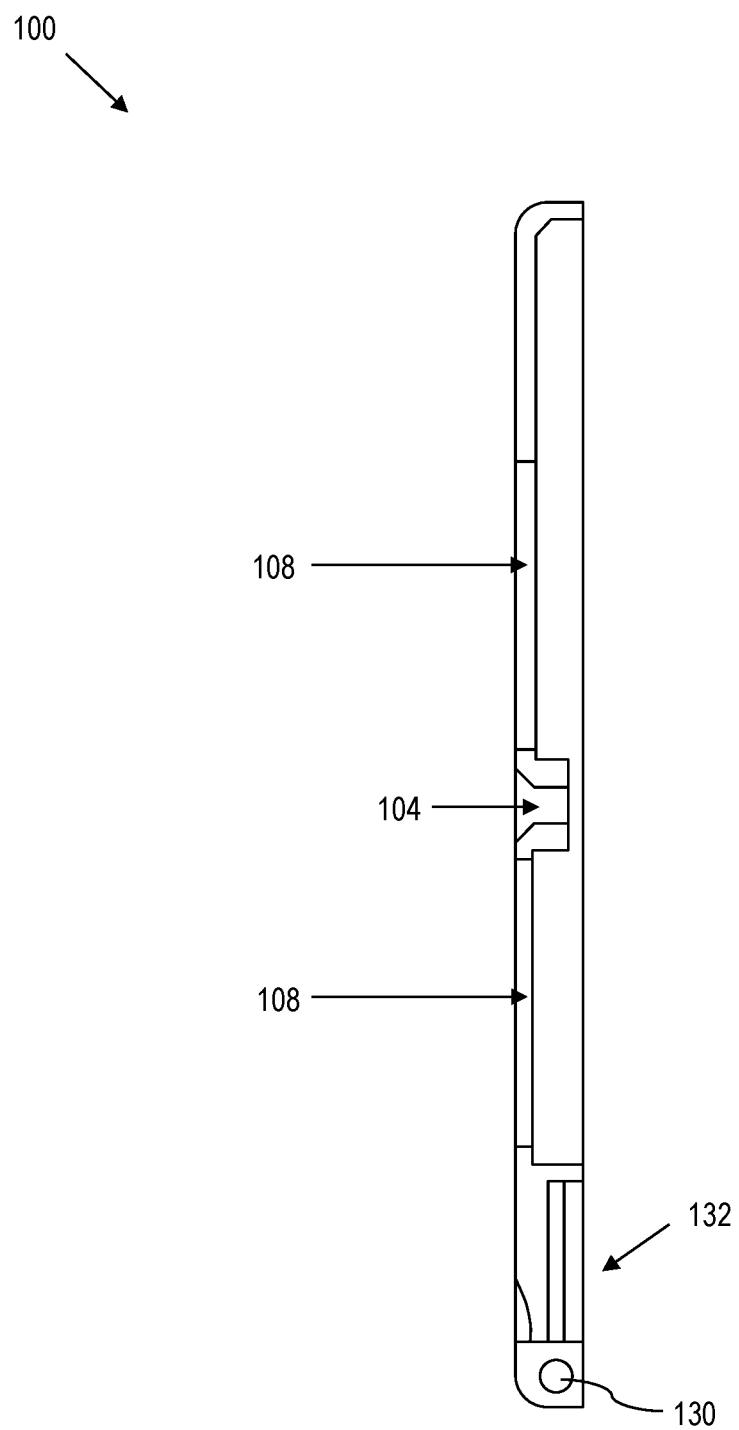
FIG. 3 is a section view along a length of a middle of the cover plate excluding the concealable panel, according to aspects of the present disclosure.

Turning now to FIG. 3, a side section view of the cover plate 100 is shown. As discussed in reference to FIG. 1, the cover plate 100 includes a fastener aperture 104, two apertures 108 for associated hardware, and a catch 130. Further, the cover plate includes a pocket 132 into which the concealable panel (102, FIGS. 1-2) slides when the concealable panel is placed into the stowed position. Thus, the pocket 132 should correspond to the concealable panel 102.

Figure 4:
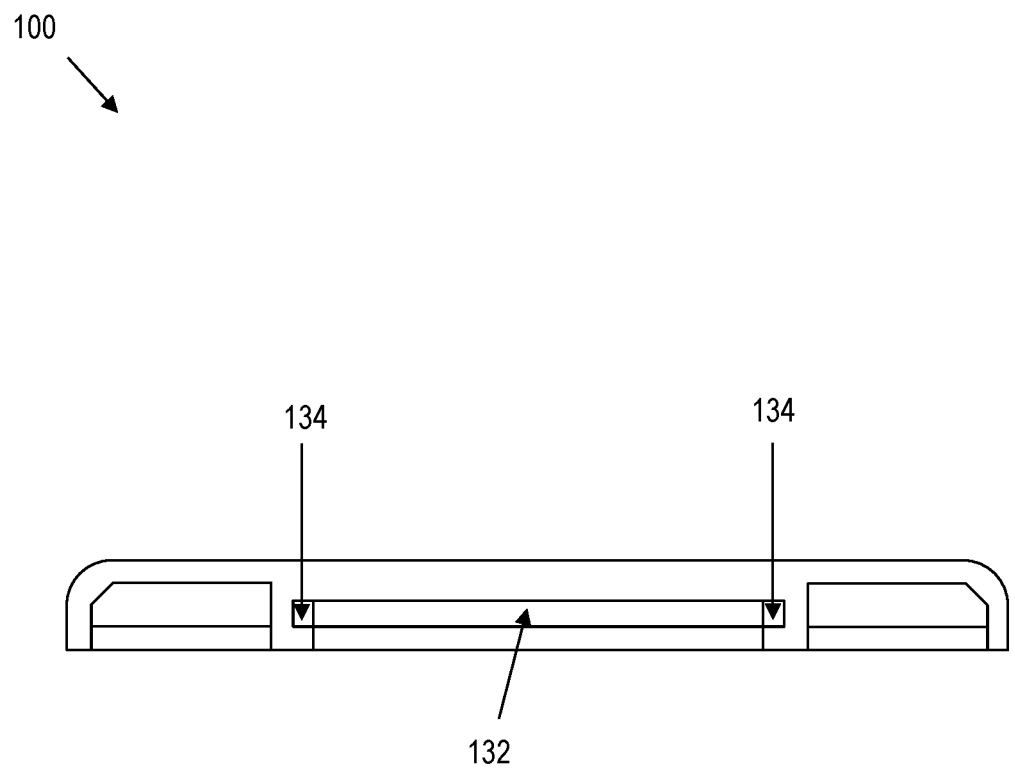
FIG. 4 is a section view along a width below a center of the cover plate excluding the concealable panel, according to aspects of the present disclosure.

FIG. 4 is a bottom section view of the cover plate 100 cut widthwise across the cover plate 100 through the pocket 132. The pocket 132 includes guide spaces 134 that allow guide tabs (see FIGS. 5-7 below) of the concealable panel 102 to slide when the concealable panel 102 is transitioned between the first position and the second position.

Figure 5:
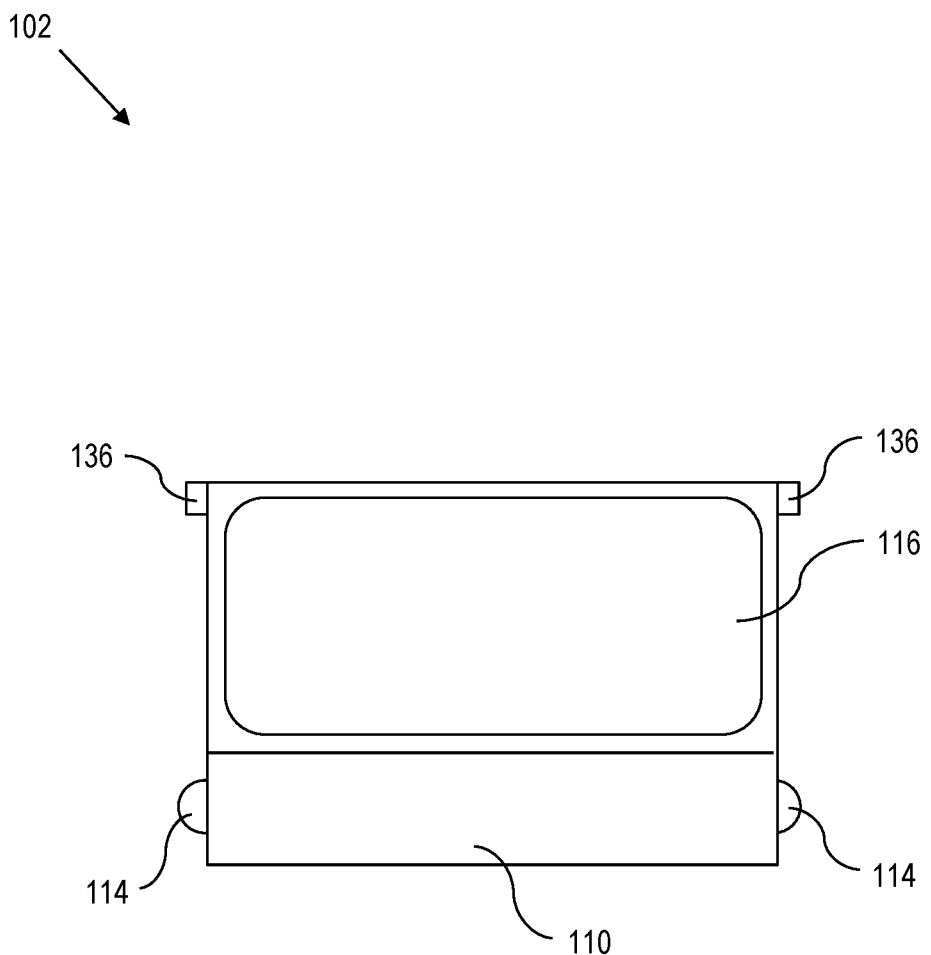
FIG. 5 is a front view of the concealable panel, according to aspects of the present disclosure.
Figure 6:
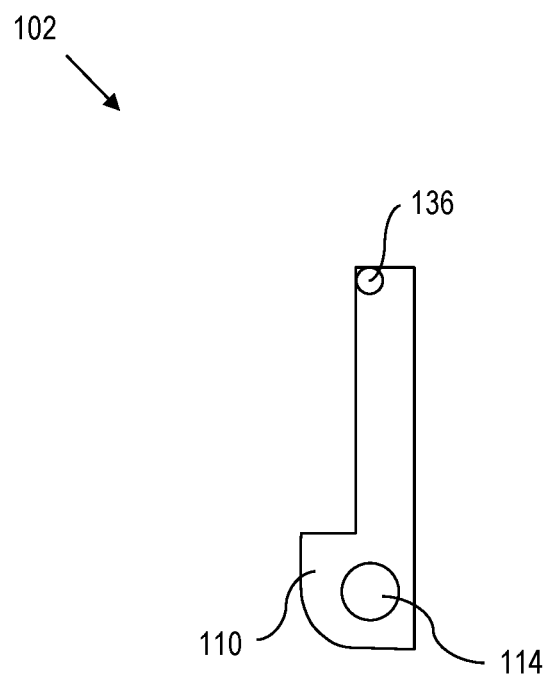
FIG. 6 is a side view of the concealable panel, according to aspects of the present disclosure.

Turning now to FIGS. 5-6, a front elevation view and a side elevation view of the concealable panel 102 are shown, respectively. As discussed above, the concealable panel 102 includes the lip 110, the projections 114, and the writing surface 116. Further, the concealable panel 102 includes guide tabs 136 that fit into the guide spaces of the pocket to allow the concealable panel 102 to slide when the concealable panel 102 is transitioned between the first position and the second position.

Figure 7:
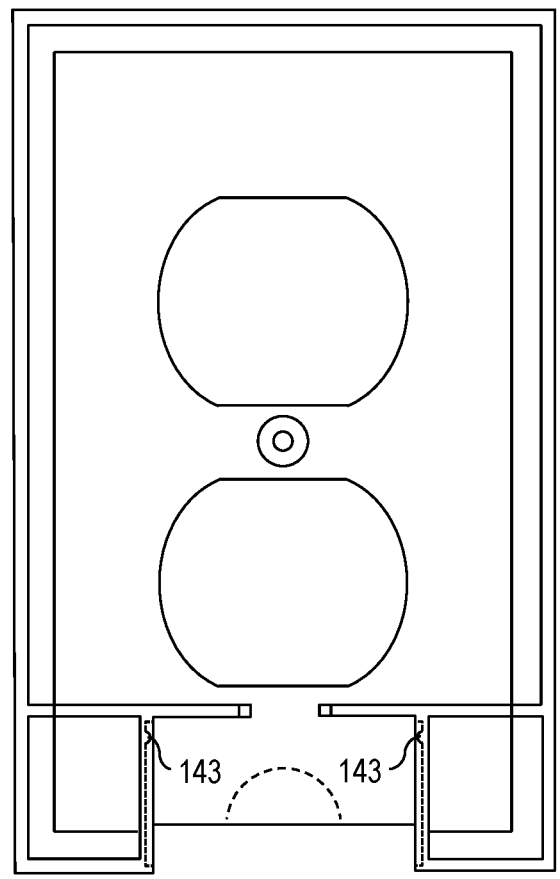
FIG. 7 is a rear view of a second embodiment of the concealable panel, according to aspects of the present disclosure.
Figure 8:
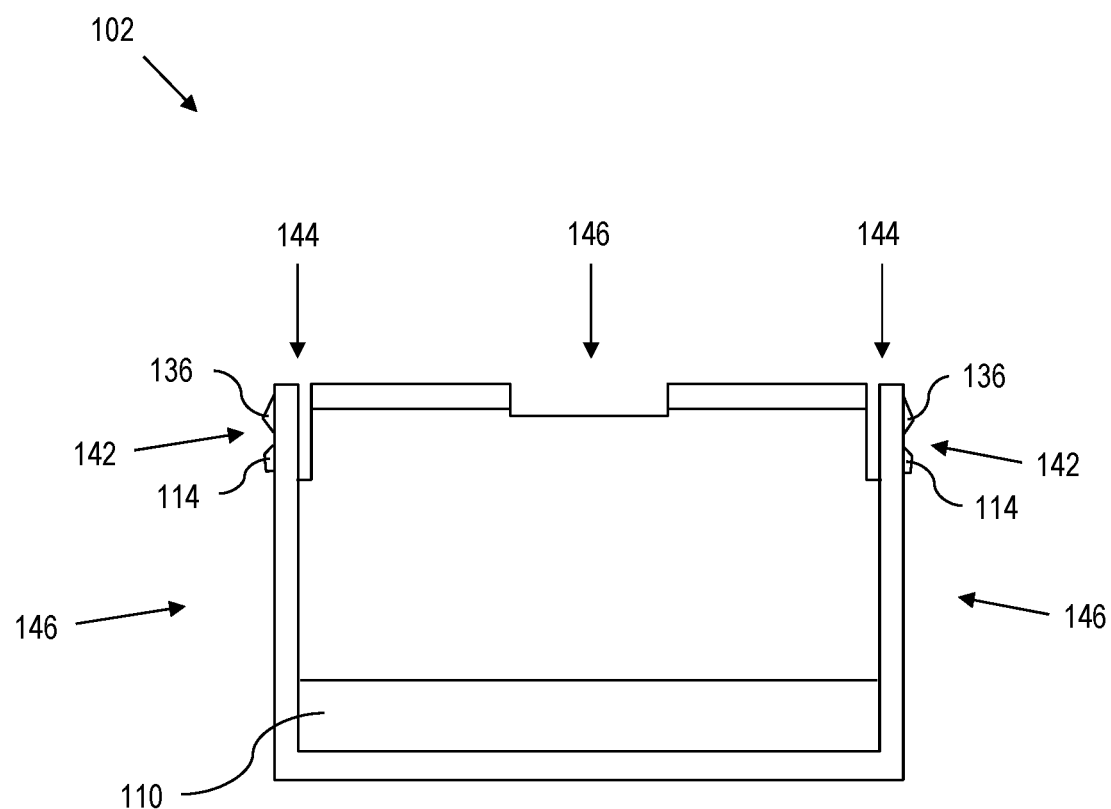
FIG. 8 is a rear view of the second embodiment of the concealable panel, according to aspects of the present disclosure.

FIGS. 7-8 illustrate a rear view of another embodiment of the concealable panel 102. Similar to the concealable panel 102 of the embodiments of FIGS. 5-6, the concealable panel 102 of FIGS. 7-8 includes a lip 110 (seen from behind) and projections 114, which are moved closer to guide tabs 136. In this embodiment, the projections and guide tabs work together to provide a space 142 for a projection 143 (i.e., an embodiment of the catch 130 of FIG. 1 for use with the spaces 142 of the present embodiment) within an embodiment of the cover plate to keep the concealable panel from transitioning between the first and second positions. Notches 144 allow to the sides 146 to bend in and use friction to remain in place as the when the concealable panel 102 is in different positions. A cutout 146 allows for a fastener (not shown, see FIG. 9) to be easily applied and removed.

Any of the features of the embodiments of the concealable panel of FIGS. 5-8 can be replaced with other features of the other embodiments. For example, the shape of the concealable panel of FIG. 5 can include the projections 114 closer to the guide tabs 136 of FIG. 8.

Figure 9:
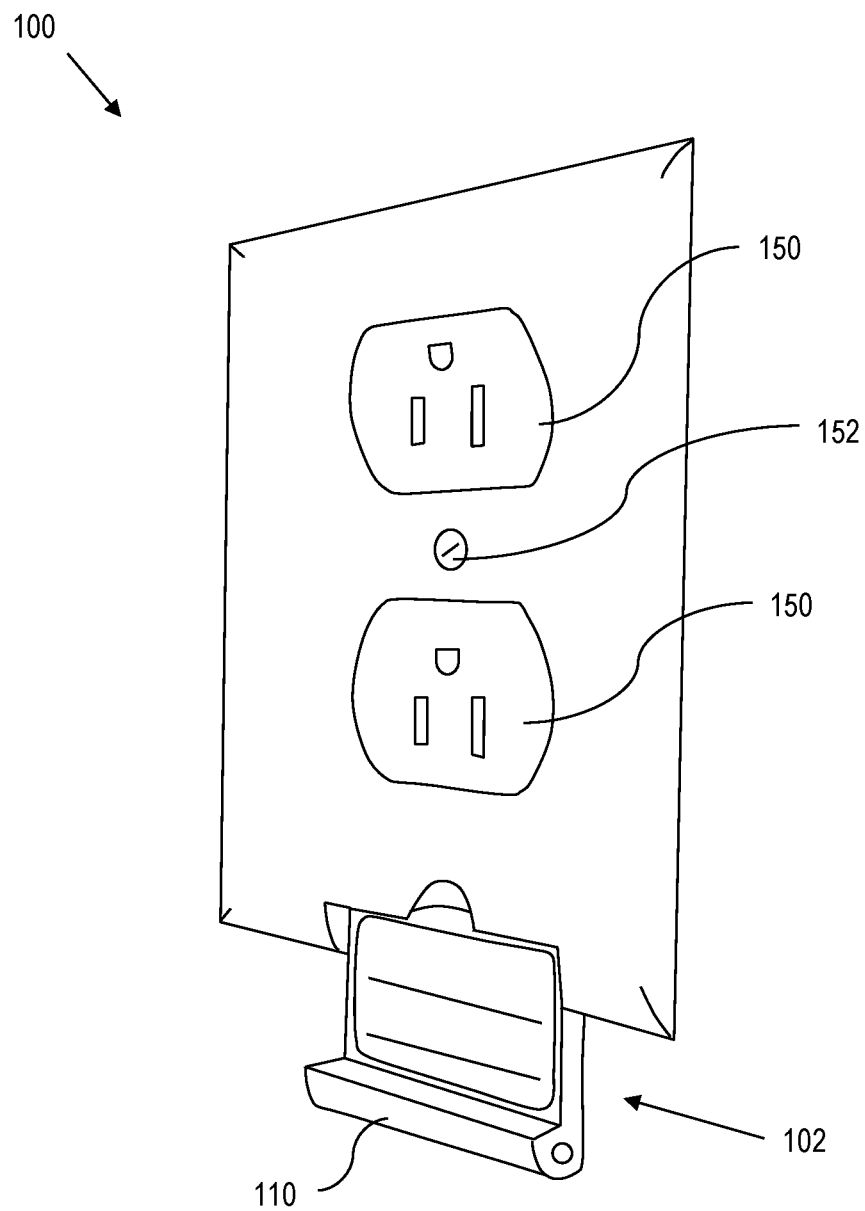
FIG. 9 is an isometric view of the cover plate with the concealable panel in an open position installed on a wall with associated hardware, according to aspects of the present disclosure.

FIG. 9 is an isometric view of the cover plate 100 coupled to associated hardware 150 of an electrical receptacle. The cover plate 100 couples to the electrical receptacle by a fastener 152 via the fastener aperture. A person may transition the concealable panel 102 from a first position (e.g., a stowed position) to a second position (e.g., an open position) by pulling on the lip 110 of the concealable panel 102. If the panel 102 is on a bottom of the cover plate 100, then the person pulls down; if the panel 102 is on a top of the cover plate 100, then the person pulls up; if the panel 102 is on a side of the cover plate 100, then the person pulls to the side. The concealable panel then slides from the first position to the second position. To transition the concealable panel between the second position back to the first position, the person applies a force to the lip in an opposite direction that was used to transition from the first position to the second position.

With the information written (e.g., by a user with a pen, pencil, marker etc.; typed; printed; etc.) on the writing surface of the concealable tab, a person would know which breaker/fuse is associated with the receptacle to which the cover plate is coupled. Thus, there is less time and energy required to determine which breaker/fuse is associated with the receptacle, yet the cover plate is still aesthetically pleasing. When information written on the writing surface needs to be changed/updated, a user can erase the old information, just place a sticker over the outdated information, or remove an old sticker and replace with a new one.

In embodiments of the cover plate discussed above, there is a separate aperture for a fastener to couple the plate to the receptacle and another separate aperture (or more) for associated hardware (e.g., electrical outlets, light switch, etc.). However, other embodiments of the cover plate have a single larger aperture for both the hastener and the associated hardware (i.e., a decorator-type cover plate). In embodiments of decorator-type plates or other cover plates where the fasteners are above or below the aperture, the pocket and concealable panel may be to a side of the aperture, as opposed to being above or below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. Aspects of the disclosure were chosen and described in order to best explain the principles of the invention and the practical application, and to enable others of ordinary skill in the art to understand the invention for various embodiments with various modifications as are suited to the particular use contemplated.

What is claimed is:

1. An outlet cover plate comprising:
   a fastener aperture for an associated fastener to mount the outlet cover to a receptacle that includes associated hardware;
   a face including:
      a pocket including a catch;
      an aperture for access to the associated hardware; and
   a concealable panel including:
      a projection that corresponds to the catch; and
      a writing surface, wherein the concealable panel fits in the pocket and is selectably positionable between:
         a first position where the concealable panel is stowed within the pocket; and
         a second position where the writing surface is viewable outside the pocket;
   wherein:
   the pocket is located below the aperture such that a user can pull down on the concealable panel to put the concealable panel from the first position to the second position;
   the projection and catch keeps the concealable panel in the first position until a force acts upon the concealable panel to pull the concealable panel down.

2. A cover plate comprising:
   a fastener aperture for an associated fastener to mount the outlet cover to a receptacle that includes associated hardware;
   a face including:
      a pocket;
      an aperture for access to the associated hardware; and
   a concealable panel, including a writing surface, wherein the concealable panel fits in the pocket and is selectably positionable between:
      a first position where the concealable panel is stowed within the pocket; and
      a second position where the writing surface is viewable outside the pocket.

3. The cover plate of claim 2, where the pocket is located below the aperture of the face such that a user can pull down on the concealable panel to put the concealable panel from the first position to the second position.

4. The cover plate of claim 2, where the pocket is located above the aperture such that a user can pull up on the concealable panel to put the concealable panel from the first position to the second position.

5. The cover plate of claim 2, where the pocket is located to a side of the aperture such that a user can pull away from the aperture the concealable panel to put the concealable panel from the first position to the second position.

6. The cover plate of claim 2, wherein:
   the pocket includes a catch; and
   the concealable panel includes a projection that corresponds to the catch of the pocket that keeps the concealable panel in the first position until a force acts upon the concealable panel to pull the concealable panel down.

7. The cover plate of claim 2, wherein:
   the pocket includes a projection; and
   the concealable panel includes a catch that corresponds to the projection of the pocket that keeps the concealable panel in the first position until a force acts upon the concealable panel to pull the concealable panel down.

8. The cover plate of claim 2, wherein the writing surface is also an erasable surface.

9. The cover plate of claim 2, wherein the face further includes a recess for a user to access the concealable panel to place the concealable panel from the first position to the second position.

* * * * *